United States Patent

Bakke

[11] Patent Number: 5,352,080
[45] Date of Patent: Oct. 4, 1994

[54] BALE HANDLING AND WRAPPING APPARATUS

[76] Inventor: Nayles G. Bakke, 18114 Memorial Estates Dr., Spring, Tex. 77379

[21] Appl. No.: 165,009

[22] Filed: Dec. 10, 1993

Related U.S. Application Data

[63] Continuation of Ser. No. 897,041, Aug. 31, 1992, abandoned.

[51] Int. Cl.$^5$ ............................................. A01D 90/08
[52] U.S. Cl. ................................ 414/24.5; 53/587; 414/24.6
[58] Field of Search .............. 414/24.5, 24.6; 53/587, 53/588

[56] References Cited

U.S. PATENT DOCUMENTS

| 4,090,616 | 5/1978 | Runyan et al. | 414/24.5 |
| 4,827,700 | 5/1989 | Rampe et al. | 53/587 |
| 4,891,930 | 1/1990 | Schaefer | 414/24.6 |
| 4,926,617 | 5/1990 | Van Mill | 53/587 |
| 4,986,057 | 1/1991 | Gainforth | 53/587 |
| 5,067,870 | 11/1991 | Steffanson | 414/24.6 |
| 5,135,343 | 8/1992 | Wigness | 414/24.6 |
| 5,178,505 | 1/1993 | Smith | 414/24.5 |

FOREIGN PATENT DOCUMENTS

| 2138389 | 10/1984 | United Kingdom | 414/24.6 |
| 2203119 | 10/1988 | United Kingdom | 414/24.5 |

Primary Examiner—Gregory A. Morse
Attorney, Agent, or Firm—Kenneth A. Keeling

[57] ABSTRACT

A hay bale handling and wrapping apparatus for removable installation on a truck bed is disclosed, including a tiltable vertical member, a rotatable hay bale handling mechanism and a wrapping mechanism. A motor is connected to the shaft of the hay bale handling mechanism by a sprocket and roller chain for rotating the hay bale handling mechanism. A pulley, a bi-directional electric winch and a cable are provided for tilting the vertical member.

8 Claims, 2 Drawing Sheets

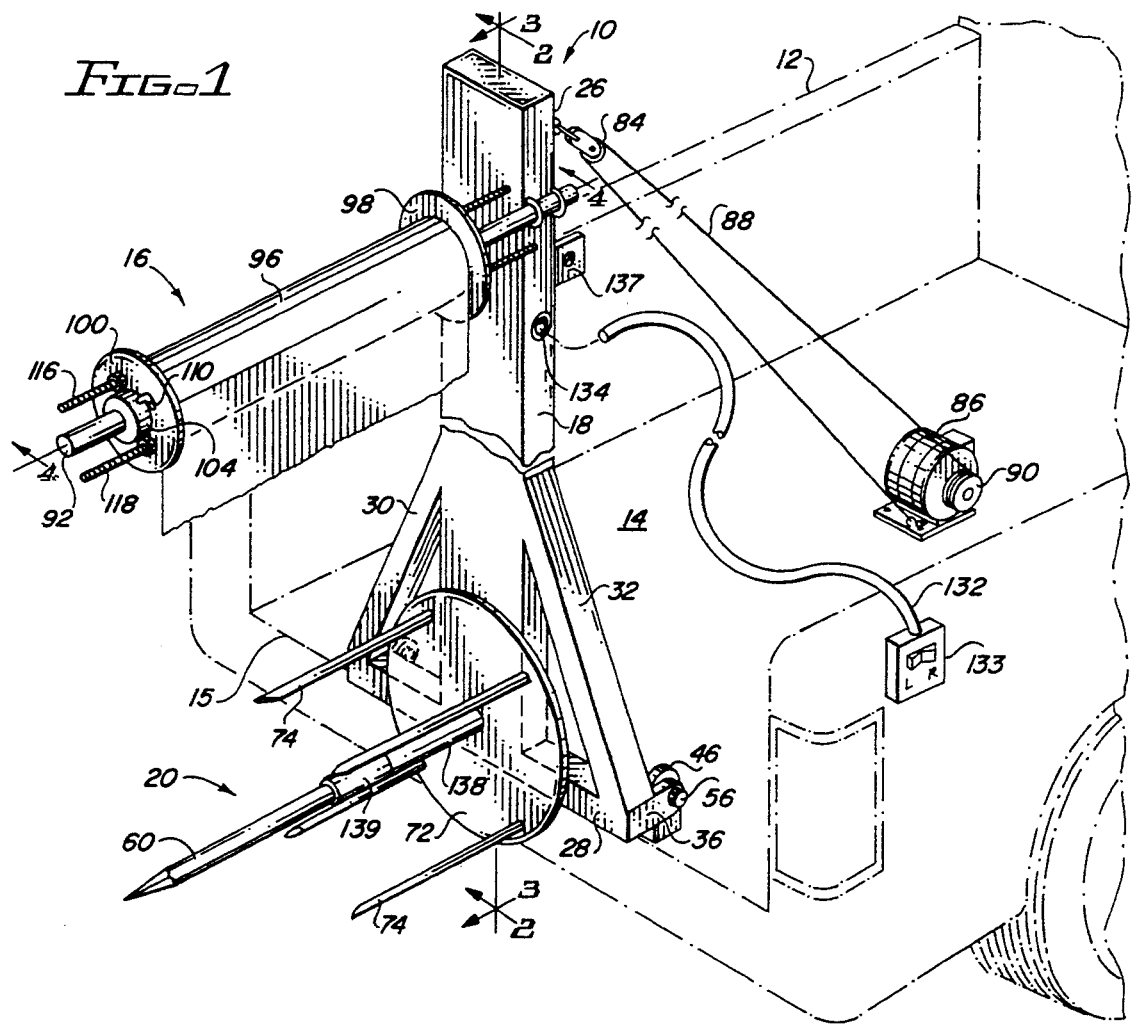

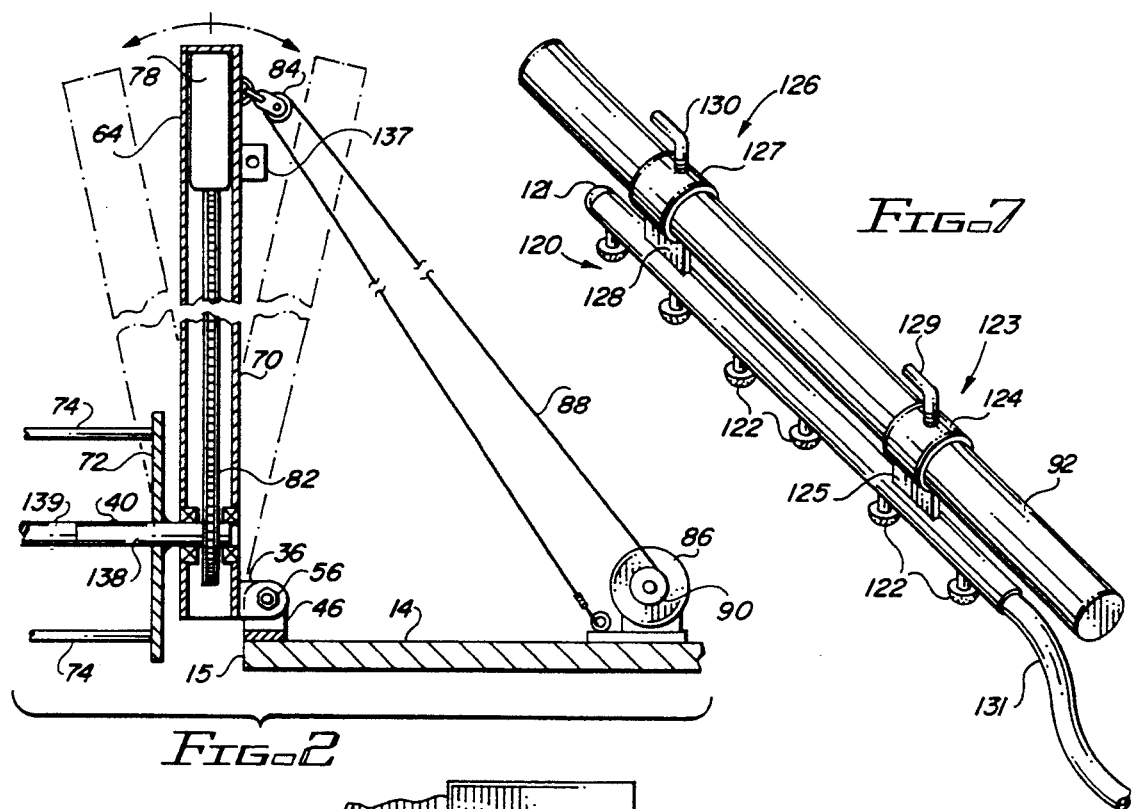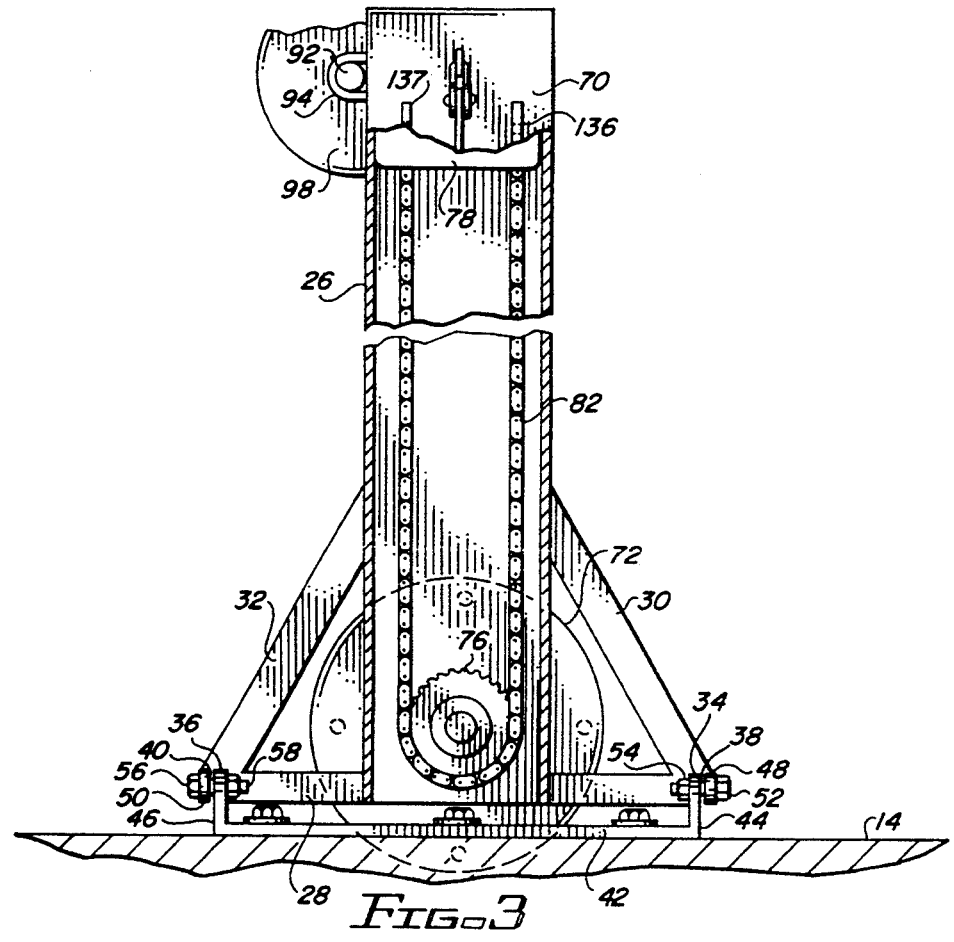

BALE HANDLING AND WRAPPING APPARATUS

This is a continuation of copending application Ser. No. 07/897,041 filed on Aug. 31, 1992, now abandoned.

BACKGROUND OF THE INVENTION

1. Field of the Invention

This invention relates generally to devices for carrying, manipulating, spraying, and wrapping, and more particularly to bale handling and wrapping apparatus readily attachable to commercially available vehicles such as pickup trucks and tractors.

2. Description of the Prior Art

Hay, alfalfa, and like feedstock are commonly stored in round bales. Various mechanisms have been developed to transport large round bales of hay from one location to another, manipulate them for purposes of loading, unloading, and dispensing, wrap them with protective material to minimize spoilage due to the elements, and apply a protective spray of beef tallow or insecticide. Historically, the methods of accomplishing these objectives have involved relatively large, expensive machines which usually utilize hydraulic power.

Walt, U.S. Pat. No. 5,026,238 discloses a bale handling mechanism and wrapping apparatus designed to be fitted on the front-end loader or three point hitch of a power source. A spindle probe is designed to engage the bale of hay and move the bale laterally to engage a wrapping mechanism.

Goodvin, U.S. Pat. No. 4,084,708 discloses a bale lifter and carrier mechanism for attachment to pickup trucks. The bale lifter consists of a tiltable frame to which two spindles are attached for engaging a round bale of hay. Prongs may also be connected to the two spindles for attachment to both ends of the bales so that it may be lifted an suspended such that the longitudinal axis of he bale is perpendicular to the direction of travel by the vehicle. The bale can then be unrolled by lowering it while still attached to the prongs until it contacts the ground. The forward motion of the vehicle then causes the bale to be unrolled onto the ground for purposes of feeding livestock.

McFarland, U.S. Pat. No. 4,084,707 discloses a device comprising a nonrotating spindle for penetrating a bale of hay along its longitudinal axis as the vehicle to which it is mounted moves towards the bale and a mechanism attached to the nonrotating spindle whereby the bale of hay can be rotated about the spindle.

Maier, U.S. Pat. No. 4,514,127 discloses a spindle for engaging a round bale of hay. The spindle may be rotated ninety degrees so that the bale will be unrolled by utilizing the friction of the ground and the forward motion of the vehicle to which the spindle is attached.

Hostetler, U.S. Pat. No. 4,044,963 discloses a round bale handling mechanism which grips the end sides of a round bale and places the bale on the bed of the vehicle by rotating the bale in an arc over the rear of the vehicle.

Penner, U.S. Pat. No. 4,886,409 discloses a frame mounted to a front end loader, an impaling bale support means utilizing spikes which can be rotated about a longitudinal axis and a bale unrolling means mounted to one side of the frame. The bale support means and the bale unrolling means are powered by hydraulic motors.

SUMMARY OF THE INVENTION

It is an object of the present invention to provide a round bale handling and wrapping apparatus which is easily and quickly attached to a vehicle and which is capable of being installed on a conventional pickup truck.

It is an additional object of this invention to provide a round bale handling and wrapping apparatus with the capacity to rotate round bales of hay in both directions for the purposes of wrapping, unwrapping or dispensing the hay for purposes of feeding livestock or storing the hay until future use.

It is an additional object of the present invention to provide a round bale handling and wrapping apparatus which is inexpensive to construct and is powered by common electrical automotive winches.

It is an additional object of the present invention to provide a round bale handling and wrapping apparatus which may be operated by a single individual exterior to the vehicle to which the bale handling and wrapping device is mounted.

It is an additional object of the present invention to provide a round bale handling and wrapping apparatus which may be interchangeably installed on multiple types of vehicles.

Other objects of the invention will become apparent from time to time throughout the specification and claims as hereinafter related. The above noted objects and other objects of the invention are accomplished by a removably installed round hay bale handling and wrapping device comprising a vertical member which is rotatably attached to a mounted base and which can be angularly rotated within a vertical plane along the longitudinal axis of the vehicle to which it is attached. The bale handling mechanism is attached to the lower part of the vertical member and extends perpendicularly from the vertical member so that the round bale of hay may be engaged and impaled upon the bale handling mechanism along its longitudinal axis without regard for the direction in which the bale was originally wound. Attached to the vertical member are two electrical automotive winches which serve to rotate the bale handling mechanism in either direction and angularly rotate the vertical member in the vertical plane. The wrapping mechanism is attached perpendicularly to the vertical member near its top and is positioned directly above the bale handling mechanism. The wrapping mechanism is capable of utilizing rolls of wrapping material which are inconsistent in width. Due to the requirement of human interaction in the process of wrapping bales of hay, the improved round bale handling and wrapping apparatus can be operated by a single person through the use of remote controls thereby eliminating the need for assistance.

BRIEF DESCRIPTION OF THE DRAWINGS

FIG. 1 illustrates an isometric view of the improved hay bale handling mechanism installed on a conventional pickup truck with the tailgate removed.

FIG. 2 illustrates a partial side profile view of the improved hay bale handling mechanism.

FIG. 3 illustrates a partial rear profile view of the improved hay bale handling mechanism.

FIG. 4 illustrates a side profile view of the bale wrapping sub-assembly of the improved hay bale handling mechanism.

FIG. 5 illustrates an exterior side end view of the bale wrapping sub-assembly of the improved hay bale handling mechanism.

FIG. 6 illustrates an interior side end view of the bale wrapping sub-assembly of the improved hay bale handling mechanism.

FIG. 7 illustrates a side profile view of the sprayer sub-assembly of the improved bale handling mechanism.

DESCRIPTION OF THE PREFERRED EMBODIMENT

FIG. 1 illustrates a pickup truck 12 with its tailgate removed and having a bed 14 upon which the improved hay bale handling apparatus 10 of the present invention is installed. Vertical mast 18 of the apparatus 10 consists of a vertically oriented, rectangular tubular member 26 which is attached along its bottom edge to a horizontally oriented rectangular tubular member 28. Horizontal member 28 extends perpendicularly to either side of vertical member 26 and is positioned parallel to and flush with the rear edge 15 of the bed of the pickup 14. Left angular support member 30 and right angular support member 32 are attached to each side of the vertical member 26, each extending from the respective end of the horizontal member 28 to the adjacent side of the vertical member 26 thereby providing lateral support for vertical member 26.

Left support arm 34 (not shown in FIG. 1) and right support arm 36 are each attached to the ends of the horizontal member 28. Left support arm 34 and right support arm 36 extend perpendicularly and generally horizontally from the horizontal member 28 in a direction opposite the rear end 15 of the pickup truck bed 14. Left support arm 34 and right support arm 36 each contain circular apertures 38 and 40 respectively, which circular apertures 38 and 40 are axially aligned with each other.

Referring to FIG. 2 and FIG. 3, rectangular mounting base 42 is provided to support vertical mast 18. Mounting base 42 is attached at end 15 of the pickup bed 14 by the use of bolts passing vertically through both the mounting base 42 and the pickup bed 14. A left mounting arm 44 and a right mounting arm 46 are attached at each end of mounting base 42 extending vertically upward from the mounting base 42. Left mounting arm 44 and right mounting arm 46 each contain axially aligned circular apertures 48 and 50 respectively. The vertical member 26 is mounted to the bed 14 of the pickup truck by positioning the vertical member 26 such that circular aperture 38 is aligned with circular aperture 48 and circular aperture 40 is aligned with circular aperture 50. Left hinge bolt 52 is inserted through circular apertures 38 and 40 and through the adjacent left support arm 34 and left mounting arm 44. Right hinge bolt 56 is inserted through circular apertures 40 and 50 and through the adjacent right support arm 36 and right mounting arm 46. Left hinge bolt 52 and right hinge bolt 56 are secured by left and right hinge bolt fastening nuts 54 and 58 respectively. Vertical member 26 can be angularly rotated within a vertical plane about the axis of the mounting hinge bolts 52 and 56.

Referring to FIG. 2, a first attaching member 136 and a second attaching member 137, each containing circular apertures, are attached to the upper portion of the vertical member 26. The first and second attaching members 136 and 137 are positioned such that the circular apertures are horizontally aligned. The first and second attaching members 136 and 137 may be used to attach the improved hay bale handling and wrapping apparatus 10 of the present invention to a front end loader (not shown) without the necessity of removing the bucket from the front end loader and may be used to attach the improved hay bale handling and wrapping apparatus 10 to the hydraulic implement mounting arms on the rear of a tractor (not shown).

Referring to FIG. 1, round bale handler 20 is attached to vertical member 26 near the bottom of the vertical member 26. Hollow cylindrical sleeve 138 of round bale handler 20 is inserted through an aperture 62 in the rear wall 64 of the vertical member 26 and abuts the front wall 70 of the vertical member 26. Central shaft 60 is welded at one end to front wall 70 of vertical member 26 and extends generally horizontally and in the direction opposite the pickup truck rear edge 15. Central shaft 60 is contained within a hollow cylindrical sleeve 138. Hollow cylindrical sleeve 138 may rotate about the central shaft 60. A second cylindrical sleeve 139 is fixedly attached to the central shaft 60 abutting cylindrical sleeve 138. The second cylindrical sleeve 139 prevents horizontal movement of the cylindrical sleeve 138 along the central shaft 60. A grease fitting 140 is provided in the first cylindrical sleeve 138 to allow lubrication to be applied to the portion of the central shaft 60 covered by the first cylindrical sleeve 138 thereby allowing cylindrical sleeve 138 to rotate with little resistance.

Base plate 72 of round bale handler 20 consists of a circular disk attached to the first cylindrical sleeve 138. Attached to base plate 72 at numerous points are rods 74 which are radially spaced near the outer edge of the base plate 72 and extend generally horizontally and outward in the direction opposite the pickup truck rear edge 15. The rods 74 are smaller in diameter than the central shaft 60 and are pointed on their unattached ends to allow them to penetrate the hay bale (not shown) to be handled. The end of the central shaft 60 not attached to vertical member 26 is also pointed to allow penetration of bales of hay.

Referring to FIG. 2 and FIG. 3, a sprocket wheel 76 is provided on first cylindrical sleeve 138 between the front wall 70 and the rear wall 64 of the vertical member 26. Rotation of sprocket wheel 76 results in rotation of first cylindrical sleeve 138, base plate 72, and rods 74 about the axis of the central shaft 60.

A first bi-directional electric winch 78 is mounted within the vertical member 26 near its top such that by the use of an empowering sprocket (not shown) and a connecting roller chain 82 the winch is functionally connected to sprocket wheel 76 thus enabling round bale handler 20 to be rotated in either direction about the axis of central shaft 60.

Referring to FIG. 1, the first bi-directional electric winch 78 can be controlled from within the cab of the pickup 135 or from outside the cab 135 through the use of a remote control switch 133. Remote control switch 133 is operatively connected to first bi-directional electric winch 78 through the electrical control cord 132 which is connected at one end to remote control switch 133 and at its remaining end to control cord plug 134 located on a side of vertical member 26. Through use of the remote control switch 133, control cord 132, and control cord plug 134, it is possible for one person to operate the improved bale handling and wrapping apparatus 10 of the present invention without need of assistance. When not in use remote control switch 133 and control cord 132 may be detached from vertical member 26 and stored.

Referring to FIG. 1 and FIG. 2, pulley 84 is attached to the front wall 70 of vertical member 26 near its top. A second bi-directional electric winch 86 is mounted to the pickup truck bed 14 such that steel cable 88 connected at one end to reel 90 of electric winch 86, routed through pulley 84, and attached at its remaining end to pickup truck bed 14 can angularly rotate vertical mast 18 in a vertical plane by increasing or decreasing the length of steel cable 88 between reel 90 of winch 86 and pickup truck bed 14.

Referring to FIG. 1, a wrapping mechanism 16 is attached to one side of vertical member 26 near its top. In the preferred embodiment of the improved hay bale handling apparatus 10, axle 92 of wrapping mechanism 14 is secured to vertical member 26 by two U-bolts. Axle 92 extends perpendicularly to vertical member 26 above round bale handler 20 in a direction generally outwardly from the pickup truck rear edge 15. Wrapping mechanism 16 allows the suspension of a roll of wrapping material 96 above round bale handler 20. Roll 96 may rotate about the axle 92 and may slide horizontally along the axle 92. As shown in FIGS. 1,4,5, and 6, round front end plate 98 and round rear end plate 100 are provided near each end of axle 92 each containing a large circular aperture 106 each and 108 respectively at their centers. Front cylindrical collar 102 and rear hollow cylindrical collar 104, are attached at the center of each end plate 98 and 100 respectively.

Collar 102 and collar 104 each contain threaded fastening screws 110 and 112 respectively. Fastening screws 110 and 112 may be tightened to secure collars 102 and 104 to axle 92, thereby preventing the roll of wrapping material 96 from moving laterally along axle 92.

Referring to FIG. 4, the roll of wrapping material 96 is positioned encircling the axis. 92 of the wrapping mechanism 16 between front end plate 98 and rear end plate 100. First threaded rod 116 and second threaded rod 118 extend between front end plate 98 and rear end plate 100 extending through apertures provided in end plates 98 and 100. Machine nuts 120 are provided at end plates 98 and 100 to secure the end plates 98 and 100 from outward lateral movement, the wrapping material 96 prohibiting closing movement.

ALTERNATIVE EMBODIMENT

Referring to FIG. 7, an alternative embodiment of the improved round bale handling and wrapping apparatus of the present invention includes a sprayer attachment 120 adjustably suspended from the axial member 92 rather than the wrapping mechanism 16. The sprayer attachment 120 is composed of pipe 121 and numerous spray nozzles 122 which are attached to the bottom of the pipe 121. A first mounting adapter 123 comprising a hollow cylindrical collar 124 and suspension member 125 is attached perpendicularly at one end to the cylindrical collar 124 and extends radially therefrom. The distal end of the suspension member 125 is attached to the top of the pipe 121 at one end of the pipe 121. In like manner, a second mounting adapter 126 is composed of a hollow cylindrical collar 127 and suspension member 128 which attached to the pipe 121 at the distal of the pipe 121. Cylindrical collars 124 and 127 are axially aligned such they may be placed on axial member 92. Cylindrical collar 124 and 127 are each provided with threaded fastening screws, 129 and 130 respectively, which may be tightened to secure collars 124 and 127 to axial member 92. Flexible hose 131 through which the substance to be sprayed onto the bale is supplied is connected to one end of pipe 121. The sprayer attachment 120 may slide horizontally along the axial member 92 while the hay bale is rotating to allow the entire surface of the bale to be covered by insecticide, beef tallow, or other liquid appropriate to be sprayed onto hay for preservation.

OPERATION

Whenever it is desirable to transport a round bale of hay for purposes of storage or for feeding livestock, second bi-directional electric winch 86 mounted to the bed of the pickup 14 is operated to extend or retract steel cable 88 angularly positioning vertical mast 18 such that attached round bale handler 20 is aligned with the longitudinal axis of a bale of hay. Pickup truck 12 is then moved backwards impaling the round bale of hay on central shaft 60 and rods 74 of round bale handler 20 until the bale of hay is adjacent to base plate 72 of bale handler 20. Second bi-directional electric winch 86 is again operated to reduce the length of steel cable 88 between the electric winch 86 and the point at which it is attached to the bed of the pickup truck 12, angularly rotating vertical mast 18, and lifting the round bale of hay off the ground. The round bale of hay can then be moved to any location which is accessible by pickup truck 12 for purposes of storing the hay or feeding it to livestock.

If the bale of hay is to be stored, once the bale is lifted off the ground, wrapping material 96 can be attached to the bale of hay. First bi-directional electric winch 78 is operated to rotate bale handler 20 in the desired angular direction so as not to unroll the bale and to allow wrapping material 96 to encircle the bale. Wrapping material 96 will then protect the bale of hay from the elements, thereby, reducing spoilage. After the bale of hay is wrapped, it may then be transported to a desired location for storage. In like manner, according to the alternative embodiment disclosed, the bale may be covered with a liquid protective coating.

If the bale of hay is to be spread to feed livestock, once the bale of hay is lifted off the ground, may be appropriately rotated through the operation of first bi-directional electric winch 78 to unwrap the bale if it has been previously wrapped. The bale of hay may then be unwound to dispense feed for livestock. The bale of hay may also be unwound while pickup truck 12 is in forward motion allowing the hay to be spread over a larger area effectively allowing more livestock simultaneous access, thereby reducing the amount of hay lost by being trampled underfoot.

I claim:

1. A hay bale handling apparatus attachable to a horizontal platform such as a truck bed comprising:
   a rigid frame supported on said platform, said frame including an upwardly-extending central column;
   bale handling means attached to said frame;
   tilting means for angularly rotating said frame in relation to said horizontal platform;
   rotating means for rotating said hay bale handling means;
   bale wrapping means attached to said column;
   attachment means for removably attaching said frame to said platform;

said bale handling means including an end member, a shaft located centrally of said end member and extending generally perpendicularly from said end member, and at least one rod extending generally perpendicularly from said end member;

said rotating means rotating said end member about an axis coincident with said central shaft thereby causing the at least one rod to revolve around said central shaft;

said wrapping means comprising an elongated member attached to an upper end of said column and extending generally perpendicularly from said column, said elongated member supporting a roll of wrapping material;

said roll of wrapping material slidably moveable along said elongated member;

said rotating means supported on said central column and angularly rotatable therewith; and said rotating means operable in a first substantially vertical column position and operable in a second angularly-rotated column position.

2. The hay bale handling apparatus according to claim 1 wherein said tilting means comprises:

a pulley and cable functionally attached to the upper portion of said column; and means for retracting and dispensing the said cable.

3. The hay bale handling apparatus according to claim 2 wherein said means for retracting and dispensing the cable comprises a bi-directional electrical winch.

4. The hay bale handling apparatus according to claim 1 wherein said rotating means for rotating said bale handling means includes:

a sprocket wheel connected to said end member; and sprocket wheel drive means comprising a chain functionally connected to said sprocket wheel and to a bi-directional electric motor.

5. A hay bale handling apparatus attachable to a horizontal platform such as a truck bed comprising:

a rigid frame supported on said platform, said frame including an upwardly-extending central column;

bale handling means attached to said frame;

bale wrapping means attached to said column;

tilting means for angularly rotating said frame in relation to said platform;

bale rotating means for rotating said bale handling means;

attachment means for removably attaching said frame to said platform;

said bale handling means including an end member rotatably attached to said frame, a shaft located centrally of said end member and extending generally perpendicularly from said end member, and a plurality of rods extending from said end member;

said rotating means attached to said central column and angularly rotatable therewith;

said rotating means including a sprocket wheel, a connecting member connecting the sprocket wheel to the end member, an electric motor disposed in said column and a drive chain functionally connecting said sprocket wheel to said motor; and said rotating means operable in a first substantially vertical column position and operable in a second angularly rotated position.

6. The hay bale handling apparatus according to claim 5 wherein said wrapping means comprises:

an elongated member attached to the upper portion of said column and located above the said bale handling means; and said elongated member supporting bale wrapping material.

7. The hay bale handling apparatus according to claim 5 wherein said tilting means comprises:

a pulley and cable functionally attached to the upper portion of said column; and a bi-directional electrical winch for retracting and dispensing said cable.

8. A hay bale handling apparatus, attachable to a horizontal platform such as a truck bed comprising:

a frame supported on said platform, said frame including an upwardly-extending central column and a lower horizontal member;

attachment means for rotatably attaching said frame to a vehicle;

bale handling means including an end member rotatably attached to said frame and a plurality of rods extending from said end member;

bale wrapping means including an elongated member attached to the upper portion of said column and located above the said bale handling means, said elongated member supporting bale wrapping material;

tilting means including a pulley and cable functionally attached to the upper portion of said column and a bi-directional electrical winch for retracting and dispensing said cable;

bale rotating means attached to said column for rotating said bale handling means, said rotating means including a sprocket wheel, a member connecting the sprocket wheel to the end member, a bi-directional electrical motor disposed in said column and a drive chain functionally connecting said sprocket wheel to said bi-directional electrical motor; and said rotating means operable in a first substantially vertical column position and operable in a second angularly rotated column position.

* * * * *